United States Patent
Shim et al.

(10) Patent No.: US 6,770,313 B2
(45) Date of Patent: Aug. 3, 2004

(54) METHOD AND APPARATUS FOR HYGIENICALLY PREPARING DRIED PEPPER BY CONTINUOUS STERILIZATION AND DRYING PROCESSES

(75) Inventors: Sun-taek Shim, Seoul (KR); Kyu-sang Park, Anyang-si (KR); Jae-hoon Kim, Namyangju-si (KR); Jae-won Yoon, Seongnam-si (KR); Seong-jin Choi, Ansan-si (KR); Nam-chul Cho, Suwon-si (KR); Jun-hwan Yang, Suwon-si (KR)

(73) Assignee: Nongshim, Co., Ltd., Seoul (KR)

( * ) Notice: Subject to any disclaimer, the term of this patent is extended or adjusted under 35 U.S.C. 154(b) by 273 days.

(21) Appl. No.: 09/893,973

(22) Filed: Jun. 29, 2001

(65) Prior Publication Data

US 2002/0086099 A1 Jul. 4, 2002

(30) Foreign Application Priority Data

Nov. 8, 2000 (KR) .......................................... 2000-66204
Feb. 16, 2001 (KR) ........................................... 2001-7841

(51) Int. Cl.⁷ .............................. A23L 4/18; A23L 7/02
(52) U.S. Cl. ........................ 426/335; 426/321; 426/518; 426/521; 426/524; 426/615
(58) Field of Search ................................ 426/335, 615, 426/321, 518, 524, 521, 327, 473, 634, 640, 638

(56) References Cited

U.S. PATENT DOCUMENTS

| | | | |
|---|---|---|---|
| 3,973,047 A | * | 8/1976 | Linaberry et al. .......... 426/473 |
| 4,336,273 A | * | 6/1982 | Lee ............................ 426/321 |
| 4,364,968 A | * | 12/1982 | Waitman et al. ............ 426/639 |
| 4,647,469 A | * | 3/1987 | Jakobsson et al. .......... 426/524 |
| 4,844,933 A | * | 7/1989 | Hsieh et al. ................. 426/521 |
| 5,518,740 A | * | 5/1996 | Costanzo et al. ............. 426/34 |
| 5,645,876 A | * | 7/1997 | Subramaniam et al. ....... 426/50 |
| 6,139,890 A | * | 10/2000 | Simpukas .................... 426/321 |

FOREIGN PATENT DOCUMENTS

JP          363258558    * 10/1988

* cited by examiner

Primary Examiner—Helen F. Pratt
(74) Attorney, Agent, or Firm—Rothwell, Figg, Ernst & Manbeck, P.C.

(57) ABSTRACT

A method and apparatus for hygienically preparing dried peppers by continuously sterilizing and drying fresh peppers are provided. The method includes: screening fresh peppers, removing the stems of the peppers, and aging the peppers; washing the peppers to remove foreign materials and pesticide residue from the surfaces of the peppers; optionally sterilizing the surfaces of the washed peppers using a chemical sterilant solution; cutting and separating seeds from the washed or sterilized peppers; sterilizing the cut peppers using a chemical sterilant solution and/or high-temperature and high-pressure steam; drying the sterilized peppers by hot air or freeze-drying; and grinding the dried peppers into a product. The preparation method includes repeated sterilization and drying processes so that a sanitary problem common to dried peppers can be solved. In addition, deep-freezing may be optionally performed as needed to improve storability and preservative quality so that quality peppers are available through the year. Because red peppers are dried by the freeze-drying, the unique flavor and texture of red peppers can easily be restored by the addition of boiling water. Each step of the dried pepper preparation method can be performed in a continuous manner so that quality peppers can be produced on a large scale at low cost.

13 Claims, 2 Drawing Sheets

METHOD AND APPARATUS FOR HYGIENICALLY PREPARING DRIED PEPPER BY CONTINUOUS STERILIZATION AND DRYING PROCESSES

BACKGROUND OF THE INVENTION

1. Field of the Invention

The present invention relates to a method and apparatus for hygienically preparing dried pepper by continuously sterilizing and drying fresh pepper.

2. Description of the Related Art

In general, most red peppers are harvested between July and September every year in Korea. Thus, there is a need for a large scale storage or processing facility for storing such a large amount of pepper produced in a short period of time and providing dried pepper as needed. Pepper has a greater internal latent heat and higher post-harvest degradation rate than other products. Accordingly, a technique of inactivating enzyme autolysis is very important for a long-period storage of a large amount of fresh pepper. In particular, a drying process for preventing deterioration within a short period of time from harvest is needed for safe, long-period storage of a large amount of fresh pepper.

According to a conventional method for preparing dried pepper, fresh pepper is dried by the sun or static hot air without additional washing process. Thus, foreign materials adhering to fresh pepper or residual pesticides are not fully removed, and the fresh pepper is exposed to pathogenic microorganisms existing in the air. In addition, there is no hygiene control in the preparation of dry pepper, so a large number of microorganisms still remain on and in the pepper. The color and flavor of dried pepper vary according to the drying time and weather conditions during drying, etc. In view of this, the conventional method cannot ensure production of dried pepper having uniform color and flavor.

As a method for hygienically producing dried pepper, a method of sterilizing pepper by radiating gamma rays on the surface of pepper is known. Gamma ray radiation method is highly effective only in reducing the number of microorganisms, but not in removing other contamination sources excluding the microorganisms. Rather, for freeze-dried red pepper, color and flavor are changed by the gamma ray radiation, degrading the quality of the dried pepper.

Also, dried pepper powder is produced by washing fresh pepper with a high-pressure cleaning device, hot air drying, and grinding the dried pepper. However, because 1000 times more microorganisms exist in the flesh of pepper than in the skin, this drying method cannot be regarded as a hygienic method.

SUMMARY OF THE INVENTION

To solve the above-described problems, it is an object of the present invention to provide a method and apparatus for hygienically producing dried pepper, in which sterilizing and drying of fresh pepper are continuously carried out.

In an aspect of the object of the present invention, there is provided a method for hygienically preparing dried peppers by continuous sterilization and drying processes, comprising: screening fresh peppers, removing the stems of the peppers, and aging the peppers; washing the peppers to remove foreign materials and pesticide residue from the surfaces of the peppers; optionally sterilizing the surfaces of the washed peppers using a chemical sterilant solution; cutting and separating seeds from the washed or sterilized peppers; sterilizing the cut peppers using a chemical sterilant solution and/or high-temperature and high-pressure steam; drying the sterilized peppers by hot air or freeze-drying; and grinding the dried peppers into a product.

It is preferable that the step of aging of fresh peppers is performed for 1–3 days in a cool and well-ventilated place. This aging step improves color and hot taste of the peppers.

It is preferable that, before or after aging, after cutting and separating the seeds from the peppers, or after hot air drying, further comprising deep-freezing and storing the peppers. The step of deep-freezing and storing peppers ensures smooth processing of the hygienically clean peppers throughout the year by efficiently storing a bunch of peppers produced in a limited short period of time It is preferable that deep-freezing and storing the peppers is performed at a temperature of −25 to −40° C. for at least 24 hours. Deep-freezing is not effective at a temperature above −25° C. Deep-freezing at less than −40° C. is undesirable for efficiency.

Preferably, the step of washing peppers is followed by surface sterilization using an appropriate sterilant. This step is more advantageous when contamination of the peppers by microorganisms is serious.

It is preferable that sterilizing the surfaces of the peppers is performed with a 0.1–0.5% sodium dichloroisocyanurate solution for at least 1 minute. The sterilization effect is poor at a sterilant concentration less than 0.1%, and use of the sterilant having a concentration greater than 0.5% is undesirable for economical reasons.

In sterilizing cut peppers separated from the seeds using the chemical sterilant solution and/or high-temperature and high-pressure steam, it is preferable that sterilizing the peppers using the chemical sterilant solution is performed with a 0.4–1.0% sodium dichloroisocyanurate solution for at least 30 seconds. The sterilization effect is poor at a sterilant concentration less than 0.4%, and use of the sterilant having a concentration greater than 1.0% is undesirable for economical reasons.

It is preferable that sterilizing the peppers using the high-temperature and high-pressure steam is performed at a temperature of 90–120° C. for 1–10 minutes.

If the sterilization temperature is less than 90° C., the sterilization effect is poor. If the sterilization temperature is above 120° C., there is a problem of quality degradation due to softening of the structures of the peppers.

It is preferable that, when sterilizing the peppers is sequentially performed using the chemical sterilant solution and the high-temperature and high-pressure steam, sterilization using the chemical sterilant solution is performed using a 0.1–0.5% sodium dichloroisocyanurate solution for 5–20 minutes and sterilization using the high-temperature and high-pressure steam is performed at a temperature of 90–120° C. for 2–10 minutes. If sterilization using the chemical sterilant solution is performed using sodium dichloroisocyanurate solution having a concentration less than 0.1% for 5 minutes or less, the sterilization effect becomes poor. If sterilization using the chemical sterilant solution is performed using sodium dichloroisocyanurate solution having a concentration greater than 0.5% for 20 minutes or more, efficiency with respect to the sterilization effect is low.

Preferably, the dried pepper preparation method further comprises mixing the sterilized peppers with a sugar solution between sterilization using the chemical sterilant solution and sterilization using the high-temperature and high-pressure steam. Mixing with the sugar solution improves the appearance of final products and anti-moisture absorption and provides rigid structure.

For a sugar solution widely used in a conventional method, such as a glucose solution, there is a problem of particle aggregation after drying due to a characteristic of the glucose solution. The glucose solution provides poor anti-moisture absorption. Quality of the resultant dried peppers as an individual item is poor, and suitability for secondary processing is undesirable. In contrast, the sugar solution used in the preparation method according to the present invention, whose composition ratios were determined by trial and error, provides significant improvements in physical properties, appearance, and anti-moisture absorption. The sugar solution according to the present invention provides distinct color and improved anti-moisture absorption, and reduces stickiness by including a mixture of trehalose and dextrin, instead of glucose. Preferably, the sugar solution comprises 30–60% by weight of trehalose, 10–40% by weight of dextrin, and 10–40% by weight of purified water, and the sugar solution is added in an amount of 1–10 kg per 20 kg peppers. The composition ratio of the sugar solution and the mixing ratio with peppers are optimized for effectiveness and efficiency.

In drying sterilized peppers by hot air or freeze-drying, it is preferable that hot air drying is performed through two steps to solve a problem of longer drying time for batch drying and to prevent quality degradation. Freeze-drying is advantageous in that unique flavor and texture of the dried red peppers can easily be restored by the addition of boiling water.

It is preferable that drying the sterilized peppers by hot air comprises a first drying performed at a temperature of 90–110° C. and a second drying performed at a temperature of 60–95° C. These temperature ranges are optimized in view of economics and product quality.

It is preferable that drying the sterilized peppers by freeze-drying is performed at a temperature of 45–70° C. for 18–23 hours in a freeze dryer after deep-freezing the sterilized peppers. If the freeze-drying is performed at less than 45° C., the cost increases due to an extended drying type. If the freeze-drying is performed above 70° C., there is a problem of quality degradation.

It is preferable that the dried pepper preparation method further comprises detecting and separating foreign materials from the dried peppers using a laser before grinding the dried peppers, and separating iron particles from the peppers after grinding the dried peppers. In this case, foreign materials including iron particles, which remain after the sterilization and washing steps, can fully be removed.

In another aspect of the object of the present invention, there is provided an apparatus for hygienically preparing dried peppers by continuous sterilization and drying processes, comprising: an aging room for screening fresh peppers and aging screened peppers to enhance flavor and color of the peppers; a washer for washing foreign materials and pesticide residue from the surfaces of the peppers with water; an optional chemical sterilizer for sterilizing the surfaces of the washed peppers; a cutter for cutting the washed or sterilized peppers into pieces of a uniform size; a seed separator for separating seeds from the cut peppers; a chemical sterilizer and/or a high-temperature and high-pressure steam sterilizer for sterilizing microorganisms existing on the surfaces of and within the peppers; first and second hot air dryers or a freeze dryer for drying the sterilized peppers; and a grinder for grinding the dried peppers into a final product, wherein each unit of the apparatus is connected by a conveyer.

Preferably, the apparatus further comprises a deep-freeze reservoir for storing the fresh peppers, aged peppers, cut peppers, or peppers dried by the first dryer.

Preferably, the apparatus further comprises a laser foreign material detector and separator for detecting and separating foreign materials from the dried peppers before grinding by the grinder, an iron particle separator for separating iron particles from the peppers after grinding by the grinder, and a wrapper.

The dried pepper preparation method according to the present invention includes repeated sterilization and drying processes so that there is no concern about a sanitary problem common to conventional dried peppers. In addition, optional deep-freezing improves storability and preservative quality of the dried peppers so that quality peppers are available throughout the year. By freeze-drying of the peppers, the unique flavor and texture of red peppers can easily be restored by the addition of boiling water.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
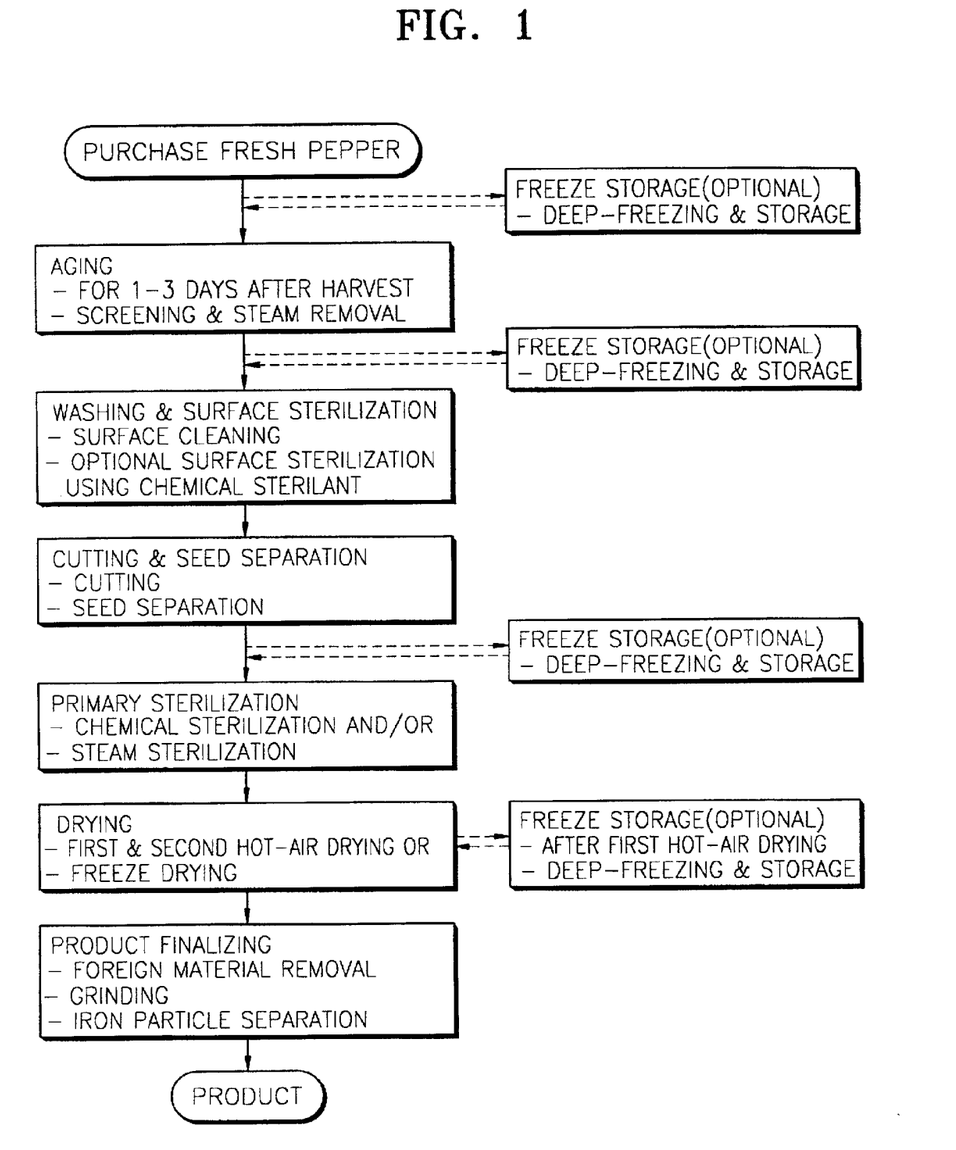
FIG. 1 is a flowchart illustrating a method for preparing dried pepper according to the present invention.
Figure 2:
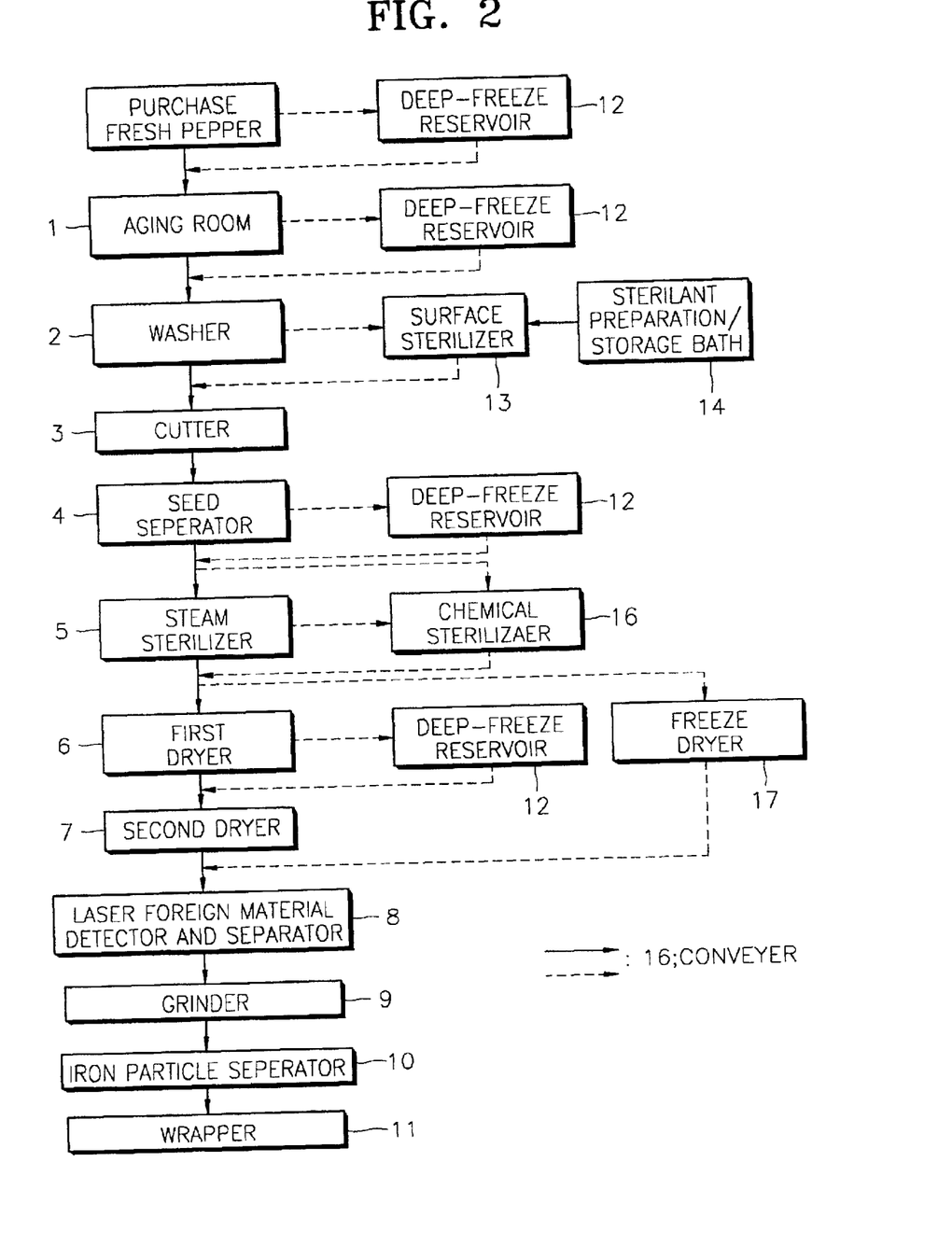
FIG. 2 shows the structure of an apparatus for preparing dried pepper according to the present invention.

Each step of a method for preparing dried pepper according to the present invention will now be described with reference to FIGS. 1 and 2.

Step 1: Screening, Stem Removing, and Aging

Fresh or frozen red peppers having good color and flavor and not damaged by insects are screened. Inedible portions, such as stems and damaged flesh, and foreign materials are removed and the screened peppers are aged in a cool and well-ventilated aging room 1.

Step 2: Surface Cleaning

The screened and aged peppers are washed with water using a washer 2, such as a rotary tumbler washer with brush, or a high-jet air bubble generator equipped washer, to remove dust, foreign materials, and pesticides adhering to the surfaces of the peppers.

Step 3: Surface Sterilization

When contamination by microorganisms is serious, the surfaces of peppers are sterilized in a surface sterilizer 13 containing a chemical sterilant by spraying or dipping. Suitable sterilants include sodium hypochlorite, sodium dichloroisocyanurate, and glycerine ester, which are safe and edible according to the food industry. About 0.1–0.5% sodium dichloroisocyanurate is more preferred as a sterilant. Over 90% of the microorganisms existing on the surfaces of the peppers and 100% of E. coli are destroyed by surface sterilization.

Step 4: Cutting & Seed Separation

The washed or surface-sterilized peppers are cut into uniform sized pieces of 4–25 mm using a cutter 3, and the flesh of the peppers are separated from the seeds using a seed separator 44. The seeds are recovered for other uses.

Step 5: Primary Sterilization

Chemical Sterilization

The peppers from which the seeds have been separated are sterilized in a chemical sterilizer 15 by spraying or dipping to remove microorganisms existing in and on the surface of the peppers. Preferably, about 0.4–1.0% sodium dichloroisocyanurate solution is used as a chemical sterilant. In this case, the peppers may be parboiled by steam in a high-temperature, high-pressure steam sterilizer 5 for about 1–15 minutes to prevent degradation of the peppers and changes in color and flavor.

Steam Sterilization

Chemical sterilization may be replaced with steam sterilization. In this case, the peppers are sterilized in the high-temperature, high-pressure steam sterilizer 5 to destroy microorganisms existing in and on the surfaces of the peppers. Preferably, steam sterilization is performed at a temperature of 90–120° C. for 1–10 minutes.

Chemical and Steam Sterilization

Alternatively, microorganisms existing in and on the surfaces of the peppers are sterilized by sequentially applying a chemical sterilant and high-temperature, high-pressure steam. Preferably, chemical sterilization is performed using a sodium dichloroisocyanurate solution of 0.1–0.5%, and steam sterilization is performed at a temperature 90–120° C. for 2–10 minutes. The microorganisms that are still alive after the first sterilization performed using a chemical sterilant can be destroyed by steam through the second sterilization, resulting in a minimum number of microorganisms after a subsequent drying process.

Step 6: Mixing with Sugar Solution

In the case where both chemical and steam sterilizations are applied in Step 5, after the first chemical sterilization, the peppers are mixed with a sugar solution of 1–10 kg per 20 kg of red peppers. The sugar solution includes 30–60% of Trehalose (available from Samyang Genex, Korea), 10–40% of dextrin (available from Saewoo Co., Korea), and 10–40% of purified water. This mixing with the sugar solution is effective in preventing moisture permeation into porous structures of freeze-dried products and keeping the original color of the peppers and rigid structure so that the peppers are not broken. If peppers are freeze-dried without mixing with the sugar solution, the results are dried peppers having porous structures and possibly softened by moisture absorption, thereby degrading product quality such as preservative quality. Also, the dried peppers may be easily broken, and pepper powder may be blown due to reduced specific gravity. The sugar solution serves as a moisturizer to prevent moisture permeation into dried peppers and provides glossy appearance and rigid structure.

Step 7:

First and Second Hot air Dryings

The sterilized peppers are put into a high-productivity, automated, continuous belt-type dryer (a first dryer having 3–5 stages and belt length of 30–50M) 6, which has a high dry rate and is equipped with automatic temperature and air volume controllers, and a flow-type, cylindrical, drum dryer (a second dryer operating at 100 Kcal/h and 2–10 rpm) 7, which are widely used in the field, and rapidly dried with hot air at a temperature of 60–120° for 1 hour. Due to the waxy surface of the peppers, quality can be degraded by a longer period, single drying process. For this reason, the first drying is performed until the moisture content reaches 40–50%, followed by moisture diffusion. Next, the second drying is performed until the moisture content reaches 12–16%.

Alternatively, for the purpose of rapidly processing a large amount of peppers, which are harvested at the same time through a short period of time, just the first drying can be performed immediately after harvest to reduce the volume of peppers, and the first-dried peppers are stored at less than −25° C. in a deep-freeze reservoir 12. The second drying of the peppers can be performed later, for example, in the off-peak season.

Freeze-Drying Process

The sterilized peppers are deep-frozen at −45° C. for 7–8 hours and dried in a freeze dryer to obtain clean, freeze-dried red peppers. Freeze-drying is performed at a temperature of 45–70° C. for 18–23 hours. The drying conditions can be varied according to the amount of products to be dried and the state of the products. If the peppers are over dried, quality degrades resulting in off-odor, off-taste, and discoloration. Thus, special caution is needed to set the drying conditions.

Step 8: Product Finalizing

The peppers dried in Step 7 are passed through a laser foreign material detector and separator 8 to remove foreign materials such as iron or copper particles. Next, the peppers are processed into flakes or powder by a grinder 9. The pepper flakes or powder are passed through an iron particle separator 10 (at 10,000–16,000 Gauss units) to separate iron particles from the pepper flakes or powder and packed into the final products by a wrapper 11.

The present invention will be described in greater detail by means of the following examples. The following examples are for illustrative purposes and are not intended to limit the scope of the invention.

EXAMPLE 1

2,000 kg of fresh peppers (produced in Youngyang, Kyungsangbuk-do, Korea, in 2000) were used. Stems of the fresh peppers were removed, then the peppers were portioned into 300 kg groups. Half of the red peppers were deeply frozen. A cleaning test was performed on unfrozen and deeply frozen red peppers.

The peppers were washed in a washer 2 equipped with a high-jet air bubble generator for about 15 seconds to 5 minutes, and the amounts of grit and foreign materials separated from the peppers were measured. The results are shown in Table 1.

TABLE 1

| | Surface Cleaning Effect | | | | | | |
|---|---|---|---|---|---|---|---|
| Cleaning Time | 15 sec | 30 sec | 1 min | 2 min | 3 min | 4 min | 5 min |
| Grit (%) | 1.2 | 0.4 | 0.02 | 0.01 | 0.01 | trace | trace |
| Foreign Materials (number/kg) | 120 | 40 | 5 | 3 | 2 | 2 | 2 |

As shown in Table 1, a large amounts of grit and foreign materials were detected at a cleaning time of 1 minute or less. The amounts of grit and foreign materials are markedly reduced at a cleaning time of 1 minute or more. The cleaning effect is not greatly improved even after cleaning longer than 5 minutes. In view of the overall processing time and economical reasons, it is preferable that the cleaning time is determined as 1–5 minutes.

Frozen peppers were thawed at room temperature for 1–3 hours and cleaned in the same manner above. As a result, the cleaning effect on the frozen peppers is the same as that of the unfrozen fresh peppers.

Instead of using the high-jet air bubble generator equipped washer, peppers were washed using a rotary tumbler washer for 1–5 minutes. The cleaning effect is the same as that of the 1–5 min cleaning with the high-jet air bubble generator equipped washer. In particular, the effect of removing pesticides from the surfaces of the peppers is excellent for the rotary tumbler washer. The result is shown in Table 2.

TABLE 2

Pesticide Removal Effect of Rotary Tumbler Washer (unit: ppm)

| Residual Pesticide | Maximum Residue Tolerance | Unwashed Dried Peppers | Washed Dried Peppers |
|---|---|---|---|
| Chloropyrifos | 0.500 | 0.019 | ND |
| Chlorobenzilate | 1.000 | 0.591 | ND |
| α-BHC | 0.200 | 0.120 | ND |

ND; Not Detected

EXAMPLE 2

When peppers are infected with many microorganisms, the effect of a primary sterilization (performed using high-temperature, high-pressure steam or chemical sterilant) to sterilize the microorganisms can be reduced. Accordingly, surface sterilization was performed using a sterilant prior to the primary sterilization.

The cleaned peppers were transferred into the surface sterilizer 13 and sterilized with sodium dichloroisocyanurate in amounts of 0.01%, 0.05%, 0.1%, 0.2%, 0.3%, 0.4%, 0.5%, and 1.0% for 1 minute. The amount of residual microorganisms on the surfaces of the peppers was measured by a general method according to a Korean food processing code. As a negative control group, peppers were sterilized in a water bath without the addition of a sterilant. The results are shown in Table 4.

After cleaning for 1 min, the peppers were sterilized and cleaned in the surface sterilizer 13 equipped with a high-jet air bubble generator. As a result, grit and foreign materials are fully removed.

For the peppers which were cleaned without using a sterilant, general bacteria were detected at a maximum number of $10^7$. For the peppers sterilized with the sterilant, the number of general bacteria decreases with increased concentration of the sterilant. In particular, at a sterilant concentration of 0.1% or more, 10–100 CFU/g of general bacteria were detected. At a sterilant concentration of 0.1% or more, the E. coli test was negative. As a result, it is evident that use of a sterilant concentration of 0.1% or more is effective for coliform sterilization. However, for the peppers treated with a 1.0% sterilant solution, the initial red color of the peppers is bleached. Accordingly, it is regarded that use of 1.0% or more sterilant solution negatively affects pepper quality. In addition, at a sterilant concentration of 0.2–0.5%, the sterilization effects are almost the same as for the sterilant concentration of 0.1%. As a result, in view of economics and sterilization effect, it is preferable that the concentration of sterilant for surface sterilization is in the range of 0.1–0.5%.

EXAMPLE 3

At a sterilant concentration of 0.1%, which was determined in Example 2, sterilization time was varied to 15 sec, 30 sec, 1 min, 2 min, 3 min, and 5 min to investigate the effect of time on sterilization. Variations in the amounts of grit and foreign materials and the degree of sterilization of microorganisms with respect to sterilization time were measured. The results are shown in Table 4.

TABLE 4

Effects of Sterilization Time on Microorganism Sterilization and Foreign Material Removal (unit: CFU/g)

| Sterilization Time | 0 sec | 15 sec | 30 sec | 1 min | 2 min | 3 min | 5 min |
|---|---|---|---|---|---|---|---|
| Grit | trace | trace | trace | trace | trace | trace | trace |
| Foreign materials | 1 | ND | ND | ND | ND | ND | ND |
| General Bacteria (number) | $10^6$–$10^7$ | $10^4$–$10^5$ | $10^2$–$10^3$ | $10^1$–$10^2$ | $10^1$–$10^2$ | $10^1$–$10^2$ | $10^1$–$10^2$ |
| Coliform | (+) | (−) | (−) | (−) | (−) | (−) | (−) |
| E. coli | (+) | (+) | (+) | (−) | (−) | (−) | (−) |

As shown in Table 4, it is apparent that sterilization of microorganisms using a 0.1% sterilant solution is effective when the sterilization is continued for at least 1 minute. The sterilization effects no longer change after 1 min sterilization. Accordingly, it is preferable that surface sterilization time is at least 1 minute.

TABLE 3

Result of Microorganism Measurement after Surface Sterilization (unit: CFU/g)

| Sterilant Concentration (%) | 0 | 0.01 | 0.05 | 0.1 | 0.2 | 0.3 | 0.4 | 0.5 | 1.0 |
|---|---|---|---|---|---|---|---|---|---|
| Grit | ND | ND | ND | ND | ND | ND | ND | ND | ND |
| Foreign Materials | ND | ND | ND | ND | ND | ND | ND | ND | ND |
| General Bacteria (number) | $10^6$–$10^7$ | $10^4$–$10^5$ | $10^4$–$10^5$ | $10^1$–$10^2$ | $10^1$–$10^2$ | $10^1$–$10^2$ | $10^1$ | $10^1$ | $<10^1$ |
| Coliform | (+ | (+) | (−) | (−) | (−) | (−) | (−) | (−) | (−) |
| E. coli | (+) | (+) | (+) | (−) | (−) | (−) | (−) | (−) | (−) |

ND; Not Detected

EXAMPLE 4

The cleaned peppers were automatically transferred to the cutter 3 by a conveyer and cut into 4–25 mm sized pieces. This cutting process is performed to allow easy permeation of heat or sterilant solution into peppers, thereby maximizing sterilization and drying effects. To investigate the primary sterilization and drying effects for both frozen and unfrozen peppers, after seed separation, some peppers were deep-frozen and stored.

EXAMPLE 5

Unfrozen and frozen cut peppers prepared in Example 4 were sterilized by steam at a temperature of 90–120° C. for 1–10 minutes. The steam sterilization effects are shown in Table 5. The frozen cut peppers were thawed at room temperature for 1–3 hours prior to steam sterilization.

TABLE 5

Steam Sterilization Effect on Microorganism at 120° C. (unit: CFU/g)

| Sterilization Time | 0 sec (control) | 1 min | 3 min | 5 min | 10 min |
|---|---|---|---|---|---|
| Coliform | $10^2$–$10^3$ | 0–10 | ND | ND | ND |
| Live Microorganisms | $10^7$–$10^8$ | $10^6$–$10^7$ | $10^5$–$10^6$ | $10^3$–$10^4$ | $10^1$–$10^2$ |

ND; Not Detected

As shown in Table 5, coliform can be fully destroyed by steam sterilization for 3 minutes. Steam sterilization for 5 minutes results in a 4-log cycle ($10^4$) reduction in the number of visible microorganisms.

EXAMPLE 6

To investigate sterilization effect using a harmless chemical sterilant, instead of high-temperature, high-pressure steam (Example 5), cut peppers were transferred to a chemical sterilizer 16 and soaked in a sterilant solution containing sodium dichloroisocyanurate of 0%, 0.1%, 0.2%, 0.3%, 0.4%, 0.5, and 1.0% for 30 seconds. The sterilization effects of the concentration of sterilant were observed. The results are shown in Table 6.

TABLE 6

Effects of Concentration of Chemical Sterilant for a 30-second Sterilization (unit: CFU/g)

| Sterilant Concentration | 0% | 0.1% | 0.2% | 0.3% | 0.4% | 0.5% | 1.0% |
|---|---|---|---|---|---|---|---|
| General Bacteria | $10^7$–$10^8$ | $10^4$–$10^5$ | $10^4$–$10^5$ | $10^3$–$10^4$ | $10^1$–$10^2$ | $10^1$–$10^2$ | <$10^1$ |
| Coliform | (+) (above $10^3$) | (+) | (−) | (−) | (−) | (−) | (−) |
| E. coli | (+) | (+) | (−) | (−) | (−) | (−) | (−) |

As shown in Table 6, as a result of measuring the degree of infection of pepper flesh by microorganisms, the number of microorganisms existing in the pepper flesh is 10–1000 times greater than on the surfaces of the peppers. Thus, there is a need to fully destroy microorganisms existing in peppers to produce hygienically clean peppers.

It is apparent from Table 6 that sterilization of both general bacteria and coliform is effective at a sterilant concentration of 0.4%. When sterilization is performed with a high concentration sterilant of 1.0%, it is highly likely that pepper quality is degraded by decoloration and chemical sterilant remaining after a final drying process. Thus, in terms of destroying microorganisms, for economical reasons and risk of sterilant remaining, it is preferable that the concentration of chemical sterilant for the internal sterilization is in the range of 0.4–1.0%.

EXAMPLE 7

At a sterilant concentration of 0.4%, which was determined in Example 6, sterilization time was varied to 15 sec, 30 sec, 1 min, 2 min, 3 min, and 5 min to investigate the effect of time on internal sterilization. The degree of sterilization of microorganisms with respect to sterilization time was observed. The results are shown in Table 7.

TABLE 7

Effects of Time in Sterilization Performed using 0.4% Chemical Sterilant (unit: CFU/g)

| Sterilization Time | 0 sec | 15 sec | 30 sec | 1 min | 2 min | 3 min | 5 min |
|---|---|---|---|---|---|---|---|
| General Bacteria (number) | $10^7$–$10^8$ | $10^3$–$10^4$ | $10^1$–$10^2$ | $10^1$–$10^2$ | <$10^1$ | <$10^1$ | <$10^1$ |
| Coliform | (+) | (−) | (−) | (−) | (−) | (−) | (−) |
| E. coli | (+) | (−) | (−) | (−) | (−) | (−) | (−) |

As shown in Table 7, it is apparent that sterilization of microorganisms using a sterilant solution of 0.4% is effective when sterilization is continued for at least 30 seconds. The sterilization effects no longer change after sterilization of above 2 minutes. Accordingly, it is preferable that internal sterilization time is in the range of 30 seconds to 2 minutes.

EXAMPLE 8

For the purpose of sequentially applying chemical and steam sterilizations to cut peppers from Example 4, first a chemical sterilization process was performed. Cut peppers were soaked in a sterilant solution containing sodium dichloroisocyanurate of 0%, 0.05%, 0.2%, 0.5%, and 1.0% for 10 minutes. The sterilization effects are shown in Table 8.

TABLE 8

Effects of Concentration of Sterilant Solution (unit: CFU/g)

| Sterilant concentration | 0% | 0.05% | 0.2% | 0.5% | 1.0% |
|---|---|---|---|---|---|
| General Bacteria | $10^6$–$10^7$ | $10^4$–$10^5$ | $10^2$–$10^3$ | $10^2$–$10^3$ | <$10^2$ |
| Coliform | (+) | (+) | (−) | (−) | (−) |

As shown in Table 8, sterilizing capability is poor at a sterilant concentration less than 0.05%. Although the sterilization effect is good at a sterilant concentration of 1.0% or greater, this concentration level is undesirable for economical reasons and quality degradation caused by unpleasant odor of the sterilant.

Next, internal sterilization time was varied to 3 min, 10 min, 20 min, and 30 min at a concentration of 0.2% of sodium dichloroisocyanurate. The sterilization effects of time are shown in Table 9.

TABLE 9

Effects of Time in Sterilization Performed using 0.2% Chemical Sterilant (unit: cFu/g)

| Sterilization Time | 3 min | 10 min | 20 min | 30 min |
|---|---|---|---|---|
| General Bacteria | $10^5$–$10^6$ | $10^2$–$10^3$ | $10^2$–$10^3$ | <$10^2$ |
| Coliform | (+) | (−) | (−) | (−) |

As shown in Table 9, sterilizing capability is poor when the sterilization is performed for less than 3 minutes. The sterilization effect is excellent for sterilization of 30 minutes or longer. However, as sterilization time becomes longer, productivity becomes low and quality degradation occurs due to, for example, unpleasant odor of the sterilant.

EXAMPLE 9

The peppers chemically sterilized in Example 8 were subjected to a steam sterilization process. The effects of a second internal sterilization by steam were investigated by adjusting the temperature of a steam sterilizer 6 in the range of 80–150° C. The results are shown in Table 8.

TABLE 10

Sterilization Effects of Temperature of Steam Sterilizer (unit: CFU/g)

| Temperature | 80° C. | 105° C. | 120° C. | 150° C. |
|---|---|---|---|---|
| General Bacteria | $10^3$–$10^4$ | $10^2$–$10^3$ | $10^1$–$10^2$ | $10^1$–$10^2$ |
| Coliform | (−) | (−) | (−) | (−) |

As shown in Table 10, sterilizing capability is poor at a temperature of steam sterilization of 80° C. or less. The steam sterilization effect is excellent at a temperature of 150° C. or more. However, sterilizing above 105° C. is undesirable for economical reasons and poor sensory characteristics.

Next, the sterilization time for steam was varied to 0 min, 2 min, 5 min, 10 min, and 15 min at a temperature of 105° C. The sterilization effects of time are shown in Table 11.

TABLE 11

Effects of Time in Sterilization by Steam at 105° C. (unit: CFU/g)

| Sterilization Time | 0 min | 2 min | 5 min | 10 min | 15 min |
|---|---|---|---|---|---|
| General Bacteria | $10^4$–$10^5$ | $10^3$–$10^4$ | $10^2$–$10^3$ | $10^2$–$10^3$ | $10^2$–$10^3$ |
| Coliform | (−) | (−) | (−) | (−) | (−) |

As shown in Table 9, sterilizing capability is poor when the steam sterilization is not performed (0 min). The sterilization effect is good for steam sterilization for 15 min or longer. However, sterilizing with steam longer than 15 min is undesirable for economical reasons and poor sensory characteristics.

EXAMPLE 10

Hygienically clean, freeze-dried red peppers were prepared by adding a sugar solution having the following compositions, as shown in Table 12, to the peppers dehydrated after chemical sterilization (Example 8) but before steam sterilization (Example 9). Sensory evaluation was conducted on clean red peppers in terms of color, stickiness, powder fluttering, anti-moisture absorption characteristics (as a physical property). 10 g of the freeze-dried red peppers to be evaluated was portioned in each container, left for 1 hour, and served to 10 panelists (5 males and 5 females) to evaluate the characteristics described above. Quality was evaluated on a 3-scale test as three levels: good (+++) moderate (++), and poor (+). The results are shown in Table 12.

TABLE 12

Sensory Evaluation Results with respect to the Composition Ratios of Sugar Solution.

| Characteristics | Composition ratios (glucose:trehalose:dextrin:purified water), % | | | | |
|---|---|---|---|---|---|
| | 0:0:0:0 | 75:0:0:25 | 0:25:50:25 | 0:50:25:25 | 0:60:20:20 |
| Color | + | ++ | ++ | +++ | +++ |
| Stickiness | +++ | + | ++ | +++ | +++ |
| Powder Fluttering | ++ | + | + | ++ | ++ |
| Anti-moisture Absorption | + | + | ++ | +++ | +++ |

EXAMPLE 11

The peppers passed through primary sterilization, i.e., Example 5 (steam sterilization), Example 7 (chemical sterilization), and Example 9 (chemical and steam sterilizations), were dried in the first dryer 6 (continuous belt-type dryer having 4 stages and length of 40 m) equipped with an automatic temperature controller by hot air at temperatures of 60° C., 70° C., 80° C., 90° C., 100° C., 110° C., and 120° C. The drying time required to reduce the moisture content to about 50% was measured at each temperature, and changes in color after drying at each temperature were visually observed. The results are shown in Table 13.

TABLE 13

Changes in Drying Time and Color with respect to Temperature Variations of the First Dryer

| Temperature | 60° C. | 70° C. | 80° C. | 90° C. | 100° C. | 110° C. | 120° C. |
|---|---|---|---|---|---|---|---|
| Time (hr) | 1.2 | 1.1 | 1.0 | 0.8 | 0.6 | 0.5 | 0.4 |
| Color | scarlet | scarlet | scarlet | scarlet | scarlet | scarlet | bleaching on cut surface |

As shown in Table 13, it takes above 1 hour to reduce the moisture content to less than 50% by hot air at a temperature less than 80° C. Slight decoloration occurs on cut surfaces of the peppers by hot air drying above 120° C. Thus, it is preferable that the temperature of a first hot air drying is in the range of 90–110° C. It takes about 0.4 hour to reach about 50% moisture content in this temperature range, and the product quality is also uniform.

EXAMPLE 12

The peppers passed through the first hot air drying in Example 11 were transported by a low-speed conveyer for 5 minutes to cause moisture diffusion and then dried in the second dryer 7 (flow-type cylindrical drum dryer operating at 100 Kcal/h), which is equipped with an automatic temperature controller, at temperatures of 60° C., 70° C., 80° C., 90° C., 95° C., 100° C., 105° C., and 110° C. Changes in color after drying at each temperature were visually observed. The results are shown in Table 14.

TABLE 14

Changes in Color with respect to Temperature Variations of the Second Dryer

| Temperature | 60° C. | 70° C. | 80° C. | 90° C. | 95° C. | 100° C. | 105° C. | 110° C. |
|---|---|---|---|---|---|---|---|---|
| color | scarlet | scarlet | scarlet | scarlet | scarlet | dark red | bleached | bleached |

As shown in Table 14, there is no change in color for drying at temperatures in the range of 60–95° C. However, color changes to dark red at a temperature of 100° C. and to orange at a temperature greater than 105° C. due to partial decololartion. Although the temperature of the second drying may vary depending on the moisture content of the product from the first drying, it is preferable that the temperature of the second drying is in the range of 60–95° C.

100 kg of the final product of the dried pepper according to the present invention was compared with 100 kg of dried peppers available commercially. The results are shown in Table 15.

TABLE 15

Comparison of Dried Peppers according to the present invention and Conventional Dried Peppers.

| Characteristics | Conventional Peppers | Clean Peppers (Present Invention) |
|---|---|---|
| Moisture Content (%) | 12.34 | 8.97 |
| Grit (%) | 0.76 | ND |
| Foreign Materials (number/kg) | 0.7 | ND |
| Hot Taste (Scovill Heat Units, SHU) | 4.580 | 6.247 |
| Color (Color Unit) | 4.350 | 5.732 |
| General Bacteria (CFU/g) | $1.6 \times 10^5$ | $1.3 \times 10$ |
| Coliform | (+) | (−) |
| E. coli | (−) | (−) |

As shown in Table 15, the clean, dried peppers according to the present invention produced through the processes described above are regarded as a safe product in the sanitary and microbiological aspects and has good and uniform quality in terms of color and hot taste.

As a result of the first and second drying processes, although the drying of pepper can be performed at low temperatures for a longer period of time, drying at a high temperature should be performed for no longer than 1 hour to ensure color and quality of the pepper.

EXAMPLE 13

By way of precaution against a shortage of the capacity of processing equipment, for example, of the second dryer, which would occur in continuous mass production, the peppers passed through the first drying in Example 2 were deep-frozen at a temperature of −25° C. to −40° C. in a deep freezer and stored therein for 24 hours. Quality of two samples passed through the second drying process, one deep-frozen after the first drying and the other not deeply frozen before the second drying, were compared for the following characteristics, as shown in Table 16. There is no great difference between the two samples, as shown in Table 16.

TABLE 16

Quality Comparison of Deep-frozen and Not-deeply Frozen peppers.

| Characteristics | Dried after Deep-freezing | Dried without Deep-freezing |
|---|---|---|
| Moisture Content (%) | 5.46 | 5.23 |
| Hot Taste (SHU) | 6.089 | 6.123 |
| Color (Color Unit) | 5.820 | 5.779 |
| General Bacteria (CFU/g) | $1.2 \times 10$ | $1.4 \times 10$ |
| E. coli | (−) | (−) |

As shown in Table 16, although peppers are stored by deep-freezing, quality of the peppers after drying is not greatly affected. Thus, when the process cannot be continued due to insufficient second dryer capacity, peppers dried by the first drying process can be temporarily stored by deep-freezing without changes in quality of the final dried product. This storage by deep-freezing can be applied to peppers which are partially dried (for the purpose of volume reduction) after being purchased in a large amount in the harvest season such that the stored peppers can be processed throughout the year as needed. Alternatively, deep-freezing can be applied immediately after purchasing of fresh pepper, after seed separation, or after surface sterilization, as needed.

EXAMPLE 14

Sensory evaluation was performed on the final product of the dried peppers obtained by the method described above using randomly selected 10 trained panelists. Quality of the clean peppers according to the present invention was compared with conventional sun-dried and hot air dried peppers by a 5-scale comparison test. The results are shown in Table 17.

TABLE 17

Quality Comparison of the Clean Dried Peppers
(Present Invention) and Conventional Dried Peppers

| Characteristics | Sun-dried | Hot air Dried | Present Invention |
|---|---|---|---|
| Flavor | 3 | 2 | 4 |
| Taste | 4 | 2 | 5 |
| Texture | 3 | 3 | 4 |
| Color | 4 | 3 | 5 |

As shown in Table 17, compared with conventional commercially available dried peppers, the clean dried peppers according to the present invention are good quality in terms of flavor, taste, texture, and color.

EXAMPLE 15

The peppers passed through primary sterilization, i.e., Example 5 (steam sterilization), Example 7 (chemical sterilization), and Example 9 (chemical and steam sterilizations), were transferred to a deep-freeze reservoir 12 and deep-frozen at 25–40° C. for 8 hours. The deep-frozen peppers were put into a freeze dryer 17 and dried at various temperatures for various times, as shown in Table 18, to obtain clean, freeze-dried peppers. Sensory evaluation was performed on the clean, freeze-dried peppers in terms of appearance, texture, taste, and overall flavor. 10 g of the freeze-dried peppers to be evaluated was portioned in each container. 250 cc boiling water (100° C.) was poured into each container and left for 3 minutes. Then, the samples were served to 10 panelists (5 males and 5 females) to evaluate the four characteristics described above. Each characteristic was evaluated to be one of three levels, good (0), moderate (Δ), and poor (x). The results are shown in Table 18.

TABLE 18

Sensory Evaluation Results with respect to Freeze Drying Conditions

| Characteristics | Freeze Drying Conditions (Temperature (° C.) and Time (hr)) | | | |
|---|---|---|---|---|
| | 40° C., 25 hr | 50° C., 22 hr | 70° C., 18 hr | 80° C., 15 hr |
| Appearance | Δ | O | O | Δ |
| Texture | Δ | O | O | x |
| Taste | O | O | O | Δ |
| Overall Flavor | O | O | O | x |

As shown in Table 18, the sensory evaluations are poor when freeze drying is performed at 40° C. for 25 hours and at 80° C. for 15 hours.

As described above, the method for hygienically preparing dried pepper according to the present invention includes repeated sterilization and drying processes so that a sanitary problem common to conventional dried peppers, such as the presence of harmful microorganisms in peppers and pesticide residue on the surfaces of the peppers, can be solved. In addition, deep-freezing may be optionally performed as needed to improve storability and preservative quality so that quality peppers are available through the year. Because red peppers are dried by the freeze-drying, the unique flavor and texture of red peppers can easily be restored by the addition of boiling water. Also, in adding a sugar solution, a mixture of trehalose and dextrin is used as a source of the sugar solution so that color becomes distinct and anti-moisture absorption is improved with reduced stickiness and powder fluttering. Each step of the hygienically clean, dried pepper preparation method according to the present invention can be performed in a continuous manner so that quality peppers can be produced on a large scale. Sterilized, dried red peppers prepared by the method according to the present invention can be produced as an individual item or as flavoring added in preparation of ramen (instant noodle) seasoning, Kimchi, table seasoning, and hot pepper paste (Kochujang).

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for hygienically preparing dried peppers by continuous sterilization and drying processes, comprising:
    screening fresh peppers, removing the stems of the peppers, and aging the peppers;
    washing the peppers to remove foreign materials and pesticide residue from the surfaces of the peppers;
    sterilizing the surfaces of the washed peppers using a 0.1–0.5% sodium dichloroisocyanurate solution for at least 1 minute;
    cutting and separating seeds from the washed or sterilized peppers;
    sterilizing the cut peppers using a chemical sterilant solution and/or high-temperature and high-pressure steam;
    drying the sterilized peppers by hot air or freeze-drying; and
    grinding the dried peppers into a product.

2. The method of claim 1, before or after aging, after cutting and separating the seeds from the peppers, or after hot air drying, further comprising deep-freezing and storing the peppers.

3. The method of claim 2, wherein deep-freezing and storing the peppers is performed at a temperature of −25 to −40° C. for at least 24 hours.

4. The method of claim 1, wherein sterilizing the peppers using the high-temperature and high-pressure steam is performed at a temperature of 90–120° C. for 1–10 minutes.

5. The method of claim 1, wherein, when sterilizing the peppers is sequentially performed using the chemical sterilant solution and the high-temperature and high-pressure steam, sterilization using the chemical sterilant solution is performed using a 0.1–0.5% sodium dichloroisocyanurate solution for 5–20 minutes and sterilization using the high-temperature and high-pressure steam is performed at a temperature of 90–120° C. for 2–10 minutes.

6. The method of claim 1, between sterilization using the chemical sterilant solution and sterilization using the high-temperature and high-pressure steam, further comprising mixing the sterilized peppers with a sugar solution.

7. The method of claim 6, wherein the sugar solution comprises 30–60% by weight of trehalose, 10–40% by weight of dextrin, and 10–40% by weight of purified water, and the sugar solution is added in an amount of 1–10 kg per 20 kg peppers.

8. The method of claim 1, wherein drying the sterilized peppers by hot air comprises a first drying performed at a temperature of 90–100° C. and a second dying performed at a temperature of 60–95° C.

9. The method of claim 1, wherein drying the sterilized peppers by freeze-drying is performed at a temperature of 45–70° C. for 18–23 hours in a freeze dryer after deep-freezing the sterilized peppers.

10. The method of claim 1, further comprising:
   detecting and separating foreign materials from the dried peppers using a laser before grinding the dried peppers; and
   separating iron particles from the peppers after grinding the dried peppers.

11. A method for hygienically preparing dried peppers by continuous sterilization and drying processes, comprising:
   screening fresh peppers, removing the stems of the peppers, and aging the peppers;
   washing the peppers to remove foreign materials and pesticide residue from the surfaces of the peppers;
   sterilizing the surfaces of the washed peppers using a 0.1–0.5% sodium dichloroisocyanurate solution for at least 30 seconds;
   cutting and separating seeds from the washed or sterilized peppers;
   sterilizing the cut peppers using a chemical sterilant solution and/or high-temperature and high-pressure steam;
   drying the sterilized peppers by hot air or freeze-drying; and
   grinding the dried peppers into a product.

12. A method for hygienically preparing dried peppers by continuous sterilization and drying processes, comprising:
   screening fresh peppers, removing the stems of the peppers, and aging the peppers;
   washing the peppers to remove foreign materials and pesticide residue from the surfaces of the peppers;
   optionally sterilizing the surfaces of the washed peppers using a chemical sterilant solution;
   cutting and separating seeds from the washed or sterilized peppers;
   sterilizing the cut peppers using a 0.1–0.5% sodium dichloroisocyanurate chemical sterilant solution for 5–20 minutes and high-temperature and high-pressure steam at a temperature of 90–120° C. for 2–10 minutes;
   drying the sterilized peppers by hot air or freeze-drying; and
   grinding the dried peppers into a product.

13. A method for hygienically preparing dried peppers by continuous sterilization and drying processes, comprising:
   screening fresh peppers, removing the stems of the peppers, and aging the peppers;
   washing the peppers to remove foreign materials and pesticide residue from the surfaces of the peppers;
   optionally sterilizing the surfaces of the washed peppers using a chemical sterilant solution;
   cutting and separating seeds from the washed or sterilized peppers;
   sterilizing the cut peppers using a chemical sterilant solution;
   mixing the sterilized peppers with a sugar solution, wherein the sugar solution comprises 30–60% by weight of trehalose, 10–40% by weight of dextrin, and 10–40% by weight of purified water, and wherein the sugar solution is added in an amount of 1–10 kg per 20 kg peppers;
   further sterilizing the cut peppers using high-temperature and high-pressure steam;
   drying the sterilized peppers by hot air or freeze-drying; and
   grinding the dried peppers into a product.

* * * * *